United States Patent
Kawamura

(10) Patent No.: US 9,170,399 B2
(45) Date of Patent: Oct. 27, 2015

(54) IMAGING LENS AND IMAGING APPARATUS

(71) Applicant: FUJIFILM CORPORATION, Tokyo (JP)

(72) Inventor: Daiki Kawamura, Saitama-ken (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/315,357

(22) Filed: Jun. 26, 2014

(65) Prior Publication Data

US 2014/0307335 A1  Oct. 16, 2014

Related U.S. Application Data

(63) Continuation of application No. PCT/JP2012/008259, filed on Dec. 25, 2012.

(30) Foreign Application Priority Data

Dec. 27, 2011 (JP) .................. 2011-284631

(51) Int. Cl.
G02B 13/00 (2006.01)
G02B 9/60 (2006.01)

(52) U.S. Cl.
CPC .............. *G02B 9/60* (2013.01); *G02B 13/0045* (2013.01)

(58) Field of Classification Search
CPC .............................. G02B 13/0045; G02B 9/60
USPC .......................................... 359/770, 714, 763
See application file for complete search history.

(56) References Cited

U.S. PATENT DOCUMENTS

2009/0226159 A1  9/2009 Sensui
2010/0201782 A1  8/2010 Yamada et al.
2010/0265380 A1* 10/2010 Fukuta .......................... 348/335

(Continued)

FOREIGN PATENT DOCUMENTS

JP  H09-166748  * 6/1997 ............. G02B 13/04
JP  2009-237542   10/2009
JP  2009-258157   11/2009
JP  2010-186011    8/2010

(Continued)

OTHER PUBLICATIONS

International Search Report—PCT/JP2012/008259—May 7, 2013.

*Primary Examiner* — Jordan Schwartz
*Assistant Examiner* — George G King
(74) *Attorney, Agent, or Firm* — Young & Thompson

(57) ABSTRACT

An imaging lens substantially consists of a first-lens-group, a stop and a second-lens-group in this order from object-side. The first-lens-group has a 1-1st-lens having negative-refractive-power and a meniscus-shape with its convex-surface facing object-side and a 1-2nd-lens having positive-refractive-power, and an object-side-lens-surface of which has a convex-shape facing object-side. The second-lens-group has a 2-1st-lens having positive-refractive-power and a meniscus-shape with its convex-surface facing image-side, a 2-2nd-lens having negative-refractive-power, and an object-side-lens-surface of which has a concave-shape facing object-side, and the absolute-value of a curvature-radius of the object-side-lens-surface is less than the absolute-value of a curvature-radius of an image-side-lens-surface thereof, and a 2-3rd-lens having positive-refractive-power, and an object-side-lens-surface of which has a convex-shape facing object-side, in this order from object-side.

20 Claims, 13 Drawing Sheets

(56) References Cited

U.S. PATENT DOCUMENTS

2012/0162776 A1* 6/2012 Nanba .......................... 359/682
2012/0170135 A1 7/2012 Oshita

FOREIGN PATENT DOCUMENTS

| | | |
|---|---|---|
| JP | 2011-059288 | 3/2011 |
| WO | 2009-063766 | 5/2009 |

* cited by examiner

EXAMPLE 1

EXAMPLE 3

EXAMPLE 4

EXAMPLE 5

EXAMPLE 6

EXAMPLE 7

IMAGING LENS AND IMAGING APPARATUS

CROSS-REFERENCE TO RELATED APPLICATIONS

This application is a Continuation of PCT International Application No. PCT/JP2012/008259 filed on Dec. 25, 2012, which claims priority under 35 U.S.C §119 (a) to Japanese Patent Application No. 2011-284631 filed on Dec. 27, 2011. Each of the above applications is hereby expressly incorporated by reference, in its entirety, into the present application.

BACKGROUND OF THE INVENTION

1. Field of the Invention

The present invention relates to an imaging lens, and particularly to a small-size lens appropriate for an imaging apparatus, such as an electronic camera. Further, the present invention relates to an imaging apparatus including such an imaging lens.

2. Description of the Related Art

In recent years, many digital cameras with large-size imaging devices for example by APS format, Four Thirds format or the like mounted therein were provided for the market. Recently, not only digital single-lens reflex cameras but also lens-interchangeable digital cameras without reflex finders and compact cameras using the large-size imaging devices became provided. The advantage of these cameras is their excellent portability because of the small size of the entire system while achieving high image qualities. As the size of the cameras has become smaller, a need for reduction in the size and the thickness of lens systems is greatly increasing.

Small-size imaging lenses composed of a small number of lenses, and which cope with such large-size imaging devices, are proposed, for example, in Japanese Unexamined Patent Publication No. 2009-237542 (Patent Document 1), Japanese Unexamined Patent Publication No. 2009-258157 (Patent Document 2), Japanese Unexamined Patent Publication No. 2010-186011 (Patent Document 3) and Japanese Unexamined Patent Publication No. 2011-059288 (Patent Document 4). In all of the imaging lenses disclosed in Patent Documents 1 through 4, a negative lens is arranged closest to an object side, and they have a lens structure with so-called retrofocus-type or similar arrangement of refractive power.

SUMMARY OF THE INVENTION

When imaging lenses are used as interchangeable lenses for cameras, especially, for single-lens reflex cameras, a long back focus is needed in some cases to insert various optical elements between a lens system and an imaging device, or to secure an optical path length for a reflex finder. In such a case, retrofocus-type arrangement of refractive power is appropriate.

Meanwhile, even in the imaging apparatuses using the aforementioned large-size imaging devices by APS format or the like, such a long back focus as required in an interchangeable lens for a single-lens reflex camera is not needed in some cases, depending on the structure of the imaging apparatus, such as a lens-interchangeable-type camera without a reflex finder or a compact camera with a built-in lens.

Here, all of the imaging lenses disclosed in Patent Documents 1 through 4 are structured in such a manner that a negative lens is arranged closest to the object side. Further, a negative lens, a positive lens and a positive lens are arranged on the image plane side of a stop. The optical total length of such type of imaging lens inevitably becomes long to secure both of a long back focus and optical performance.

When the imaging lenses disclosed in Patent Documents 1 through 4 are applied to imaging apparatuses using the aforementioned large-size imaging devices by APS format or the like, it is possible to secure high optical performance. However, it is desirable that the size of the imaging lenses is also reduced to meet the excellent portability of the imaging apparatuses, the size of which as the entire system is small.

In view of the foregoing circumstances, it is an object of the present invention to provide a thin low-cost imaging lens that suppresses an angle of incidence to an imaging device while securing optical performance for coping with a large-size imaging device, and which is formable in small size, and to provide an imaging apparatus to which the imaging lens has been applied.

An imaging lens of the present invention substantially consists of a first lens group, a stop and a second lens group in this order from an object side.

The first lens group substantially consists of a 1-1st lens having negative refractive power and a meniscus shape with its convex surface facing the object side, and a 1-2nd lens having positive refractive power, and an object-side lens surface of which has a convex shape facing the object side, in this order from the object side.

The second lens group substantially consists of a 2-1st lens having positive refractive power and a meniscus shape with its convex surface facing an image side, a 2-2nd lens having negative refractive power, and an object-side lens surface of which has a concave shape facing the object side, and the absolute value of a curvature radius of the object-side lens surface of which is less than the absolute value of a curvature radius of an image-side lens surface thereof, and a 2-3rd lens having positive refractive power, and an object-side lens surface of which has a convex shape facing the object side, in this order from the object side.

The imaging lens of the present invention substantially consists of the first lens group and the second lens group. However, lenses substantially without any refractive power, optical elements other than lenses, such as a stop and a cover glass, mechanical parts, such as a lens flange, a lens barrel, an imaging device, and a hand shake blur correction mechanism, and the like may be included in addition to the two lens groups.

Further, in the present invention, the surface shape of a lens, such as a convex surface, a concave surface, a flat surface, biconcave, meniscus, biconvex, plano-convex and plano-concave, and the sign of the refractive power of a lens, such as positive and negative, are considered in a paraxial region unless otherwise mentioned when a lens includes an aspherical surface. Further, in the present invention, the sign of a curvature radius is positive when a surface shape is convex toward an object side, and negative when a surface shape is convex toward an image side.

In the imaging lens of the present invention, it is desirable that each of the three lenses constituting the second lens group is arranged with an air space therebetween.

In the imaging lens of the present invention, it is desirable that one of the three lenses constituting the second lens group is an aspheric lens having at least one aspherical surface. Especially, it is desirable that the 2-1st lens of the three lenses constituting the second lens group is an aspheric lens.

In this case, it is desirable that all lenses in an entire system except the aspheric lens are spherical lenses.

In the imaging lens of the present invention, it is desirable that the following conditional formula (1) is satisfied:

$$1.2 < f/|f4| < 2.9 \qquad (1),\text{ where}$$

f4: a focal length of the 2-2nd lens, and
f: a focal length of an entire system.

In this case, it is more desirable that the following conditional formula (1-1) is satisfied:

$$1.3 < f/|f4| < 2.8 \qquad (1\text{-}1).$$

In the imaging lens of the present invention, it is desirable that the following conditional formula (2) is satisfied:

$$0.5 < f/f3 < 1.5 \qquad (2),\text{ where}$$

f3: a focal length of the 2-1st lens, and
f: a focal length of an entire system.

In this case, it is more desirable that the following conditional formula (2-1) is satisfied:

$$0.6 < f/f3 < 1.4 \qquad (2\text{-}1).$$

In the imaging lens of the present invention, it is desirable that the following conditional formula (3) is satisfied:

$$0.5 < f/f5 < 1.5 \qquad (3),\text{ where}$$

f5: a focal length of the 2-3rd lens, and
f: a focal length of an entire system.

In this case, it is more desirable that the following conditional formula (3-1) is satisfied:

$$0.6 < f/f5 < 1.4 \qquad (3\text{-}1).$$

In the imaging lens of the present invention, it is desirable that the following conditional formula (4) is satisfied:

$$0.6 < f/fG1 < 1.5 \qquad (4),\text{ where}$$

fG1: a focal length of the first lens group, and
f: a focal length of an entire system.

In this case, it is more desirable that the following conditional formula (4-1) is satisfied:

$$0.7 < f/fG1 < 1.4 \qquad (4\text{-}1).$$

In the imaging lens of the present invention, it is desirable that the following conditional formula (5) is satisfied:

$$Ndp > 1.75 \qquad (5),\text{ where}$$

Ndp: an average of refractive indices of the 1-2nd lens, the 2-1st lens and the 2-3rd lens for d-line.

In this case, it is more desirable that the following conditional formula (5-1) is satisfied:

$$Ndp > 1.78 \qquad (5\text{-}1).$$

In the imaging lens of the present invention, it is desirable that the following conditional formula (6) is satisfied:

$$0.3 < f123/f < 0.9 \qquad (6),\text{ where}$$

f123: a combined focal length of the 1-1st lens, the 1-2nd lens and the 2-1st lens, and
f: a focal length of an entire system.

In this case, it is more desirable that the following conditional formula (6-1) is satisfied:

$$0.4 < f123/f < 0.8 \qquad (6\text{-}1).$$

In the imaging lens of the present invention, it is desirable that the following conditional formula (7) is satisfied:

$$8° < |\alpha| < 20° \qquad (7),\text{ where}$$

α: an angle of a principal ray reaching a maximum image height with respect to an optical axis when the imaging lens is focused on an object at infinity.

In this case, it is more desirable that the following conditional formula (7-1) is satisfied:

$$9° < |\alpha| < 19° \qquad (7\text{-}1).$$

In the imaging lens of the present invention, it is desirable that the following conditional formula (8) is satisfied:

$$0.35 < Y/f < 0.70 \qquad (8),\text{ where}$$

Y: a maximum image height, and
f: a focal length of an entire system.

In this case, it is more desirable that the following conditional formula (8-1) is satisfied:

$$0.40 < Y/f < 0.65 \qquad (8\text{-}1).$$

In the imaging lens of the present invention, it is desirable that the following conditional formula (9) is satisfied:

$$0.70 < ST/TL < 0.95 \qquad (9),\text{ where}$$

ST: a distance on an optical axis from the stop to an image plane, and
TL: a distance on the optical axis from a most-object-side lens surface in an entire system to the image plane (a back focus portion is a distance in air).

In this case, it is more desirable that the following conditional formula (9-1) is satisfied:

$$0.75 < ST/TL < 0.95 \qquad (9\text{-}1).$$

An imaging apparatus according to the present invention includes the imaging lens of the present invention, as described above.

In the imaging lens of the present invention, the first lens group substantially consists of a 1-1st lens having negative refractive power and a meniscus shape with its convex surface facing the object side and a 1-2nd lens having positive refractive power, and an object-side lens surface of which has a convex shape facing the object side, in this order from the object side. Therefore, it is possible to correct various aberrations, such as a spherical aberration, curvature of field and chromatic aberrations, generated in the first lens group, in a well-balanced manner.

Since the second lens group substantially consists of three lenses, reduction in thickness, weight and cost is achievable.

Since the 2-1st lens constituting the second lens group has positive refractive power and a meniscus shape with its convex surface facing an image side, it is possible to excellently correct a spherical aberration when the total length is reduced while a necessary back focus is secured.

Since the 2-2nd lens constituting the second lens group has negative refractive power, and an object-side lens surface of the 2-2nd lens has a concave shape facing the object side, and the absolute value of a curvature radius of the object-side lens surface of the 2-2nd lens is less than the absolute value of a curvature radius of an image-side lens surface of the 2-2nd lens, it is possible to suppress a coma aberration and distortion.

Since the 2-3rd lens constituting the second lens group has positive refractive power, and an object-side lens surface of the 2-3rd lens has a convex shape facing the object side, it is possible to suppress an exit angle of peripheral rays without making a back focus too long.

The imaging apparatus of the present invention includes the imaging lens of the present invention. Therefore, the imaging apparatus is structurable in small size and at low cost. Further, excellent images with high resolution, and in which various aberrations have been corrected, are obtainable.

DESCRIPTION OF THE PREFERRED EMBODIMENTS

Figure 1:
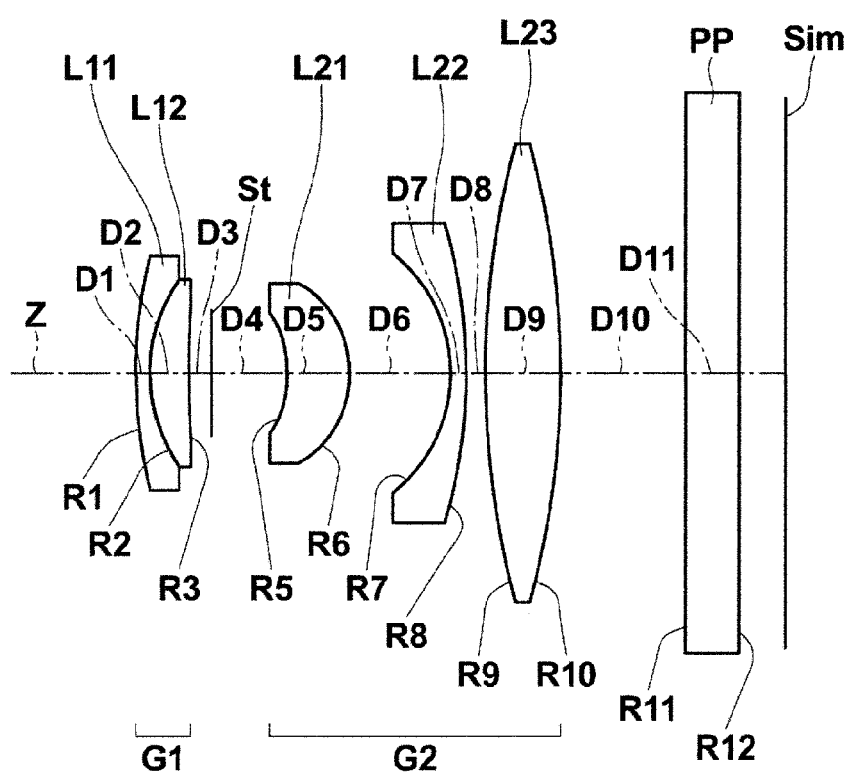
FIG. 1 is a cross section illustrating the lens structure of an imaging lens according to Example 1 of the present invention.

Hereinafter, embodiments of the present invention will be described in detail with reference to drawings. FIG. 1 is a cross section illustrating an example of the structure of an imaging lens according to an embodiment of the present invention. FIG. 1 corresponds to an imaging lens of Example 1, which will be described later. FIG. 2 through FIG. 7 are cross sections illustrating other examples of the structure of an imaging lens according to embodiments of the present invention. FIG. 2 through FIG. 7 correspond to imaging lenses of Examples 2 through 7, which will be described later, respectively. In the examples illustrated in FIG. 1 through FIG. 7, the basic structure is substantially similar to each other, and the illustration method is also similar. Therefore, the imaging lens according to the embodiments of the present invention will be described mainly with reference to FIG. 1.

In FIG. 1, the left side is the object side and the right side is the image side, and the arrangement of an optical system at infinity focus is illustrated. FIG. 2 through FIG. 7, which will be described later, are illustrated in a similar manner.

The imaging lens according to an embodiment of the present invention substantially consists of first lens group G1 and second lens group G2, as lens groups, in this order from the object side. Further, aperture stop St is arranged between first lens group G1 and second lens group G2.

First lens group G1 substantially consists of a 1-1st lens and a 1-2nd lens cemented on the 1-1st lens in this order from the object side. In the embodiment of the present invention, first lens group G1 substantially consists of 1-1st lens L11 having negative refractive power and a meniscus shape with its convex surface facing the object side and 1-2nd lens L12 having positive refractive power, and an object-side lens surface of which has a convex shape facing the object side.

First lens group G1 has similar structure also in Examples 2 through 7, which will be described later.

Second lens group G2 substantially consists of three lenses of a 2-1st lens, a 2-2nd lens and 2-3rd lens in this order form the object side. In the embodiment of the present invention, second lens group G2 substantially consists of 2-1st lens L21 having positive refractive power and a meniscus shape with its convex surface facing an image side, and an object-side surface and an image-side surface of which are aspherical surfaces, 2-2nd lens L22 having negative refractive power, and an object-side lens surface of which has a concave shape facing the object side, and the absolute value of a curvature radius of the object-side lens surface of which is less than the absolute value of a curvature radius of an image-side lens surface thereof, and 2-3rd lens L23 having positive refractive power, and an object-side lens surface of which has a convex shape facing the object side, in this order from the object side. Further, each of 2-1st lens L21, 2-2nd lens L22 and 2-3rd lens L23 is arranged with an air space therebetween.

Second lens group G2 has similar structure also in Examples 2 through 7, which will be described later. Further, the object-side surface and the image-side surface of 2-1st lens L21 are aspherical surfaces also in Examples 2, 4, 5, 6 and 7. In Example 3, the object-side surface of 2-1st lens L21 is an aspherical surface.

Further, aperture stop St, illustrated in FIG. 1, does not necessarily represent the size nor the shape of aperture stop St, but the position of aperture stop St on optical axis Z. Further, the sign of Sim, illustrated here, represents an image formation plane. An imaging device, for example, such as a CCD (Charge Coupled Device) and a CMOS (Complementary Metal Oxide Semiconductor), is arranged at this position, as will be described later.

Further, FIG. 1 illustrates an example in which parallel-flat-plate-shaped optical member PP is arranged between second lens group G2 and image formation plane Sim. When an imaging lens is applied to an imaging apparatus, a cover glass, various kinds of filter, such as an infrared ray cut filter and a low-pass filter, or the like is often arranged between an optical system and image formation plane Sim based on the structure of the imaging apparatus on which the lens is mounted. The aforementioned optical member PP assumes such elements.

In the imaging lens according to the embodiment of the present invention, focusing is performed by moving the entire optical system along optical axis Z.

In the imaging lens according to the embodiment of the present invention, first lens group G1 substantially consists of 1-1st lens L11 having negative refractive power and a meniscus shape with its convex surface facing the object side and 1-2nd lens L12 having positive refractive power, and an object-side lens surface of which has a convex shape facing the object side. Therefore, it is possible to correct various aberrations, such as a spherical aberration, curvature of field and chromatic aberrations, generated in first lens group G1, in a well-balanced manner. Further, excellent achromatization is achievable by most appropriately arranging a cemented lens.

Further, since second lens group G2 substantially consists of three lenses L21, L22 and L23, reduction in the thickness, the weight and the cost is achievable.

Further, since 2-1st lens L21 has positive refractive power and a meniscus shape with its convex surface facing an image side, it is possible to excellently correct a spherical aberration when the total length is reduced while a necessary back focus is secured.

Further, since 2-2nd lens L22 has negative refractive power, and an object-side lens surface of 2-2nd lens L22 has a concave shape facing the object side, and the absolute value of a curvature radius of the object-side lens surface of 2-2nd lens is less than the absolute value of a curvature radius of an image-side lens surface of 2-2nd lens, it is possible to suppress a coma aberration and distortion.

Further, since 2-3rd lens L23 has positive refractive power, and an object-side lens surface of 2-3rd lens L23 has a convex shape facing the object side, it is possible to suppress the exit angle of peripheral rays without making a back focus too long.

Further, in the imaging lens according to the present invention, each of three lenses L21, L22 and L23 constituting second lens group G2 is arranged with an air space therebetween. Therefore, flexibility in designing the lenses becomes higher, and that is advantageous to correction of aberrations. Further, there is an advantage that aspherical surfaces are flexibly settable on both surfaces.

In the imaging lens according to the embodiment of the present invention, one of the three lenses L21, L22 and L23 constituting second lens group G2 is an aspheric lens having at least one aspherical surface. It is more desirable that 2-1st lens L21 is an aspheric lens. When an aspheric lens is provided in second lens group G2 in this manner, it is possible to keep excellent balance between axial aberrations and off-axial aberrations, and to excellently correct curvature of field.

If an aspherical surface is provided on a lens arranged closer to the image plane, rays passing through the lens surface and traveling toward respective image heights have been separated from each other. Therefore, the effect of the aspherical surface is easily utilizable. However, in the same type of imaging lens as the imaging lens according to the embodiment of the present invention, the diameter of a lens sharply increases toward the image plane side. Therefore, there is a problem that the cost becomes high. Especially, the imaging lens according to the embodiment of the present invention assumes use of a large-size imaging device. Therefore, the outer diameter of a last lens tends to become very large. Meanwhile, the imaging lens according to the embodiment of the present invention gives priority to reduction in thickness. Therefore, unless correction of aberrations is extremely difficult as in the case of a wide angle of view, a large diameter and the like, even if the lens is located close to stop St, the cost is reducible while a certain degree of aberration correction capability is possessed. Therefore, it is desirable that the aspherical surface is provided especially on 2-1st lens L21, which is a more front-side lens, instead of 2-3rd lens L23, which is the last lens.

In the imaging lens according to the embodiment of the present invention, it is possible to reduce the cost by adopting an aspheric lens, only as one of three lenses L21, L22 and L23 constituting second lens group G2, and spherical lenses, as the other lenses.

The imaging lens according to the embodiment of the present invention has structure, as described above, and satisfies the following conditional formula (1):

$$1.2 < f/|f4| < 2.9 \quad (1),\text{ where}$$

f4: a focal length of 2-2nd lens L22, and
f: a focal length of an entire system.

Further, in the range defined by conditional formula (1), especially the following conditional formula (1-1) is satisfied:

$$1.3 < f/|f4| < 2.8 \quad (1\text{-}1).$$

Conditions defined by conditional formula (1), in other words, specific values of the literal parts of the expression for each example will be collectively shown in Table 15. This is similar also for conditional formulas (2) through (9), which will be described later.

When conditional formula (1) is satisfied, as described above, the imaging lens according to the embodiment of the present invention can achieve the following effects. Specifically, conditional formula (1) defines a relationship between the focal length of the entire system and the focal length of 2-2nd lens L22. If the value exceeds the upper limit value, correction of astigmatism and a lateral chromatic aberration becomes difficult, and that is not desirable. On the other hand, if the value is lower than the lower limit value, correction of curvature of field becomes difficult, and that is not desirable.

In the imaging lens according to the embodiment of the present invention, especially when conditional formula (1-1) is also satisfied in the range defined by conditional formula (1), the aforementioned effects are more remarkably achievable.

Further, the imaging lens according to the embodiment of the present invention satisfies the following conditional formula (2). Further, especially conditional formula (2-1) is satisfied in the range defined by conditional formula (2):

$$0.5 < f/f3 < 1.5 \quad (2);\text{ and}$$

$$0.6 < f/f3 < 1.4 \quad (2\text{-}1),\text{ where}$$

f3: a focal length of 2-1st lens L21, and
f: a focal length of an entire system.

Conditional formula (2) defines a relationship between a focal length of an entire system and a focal length of 2-1st lens L21. If the value exceeds the upper limit value, correction of various aberrations, in particular, correction of curvature of field and distortion becomes difficult, and that is not desirable. On the other hand, if the value is lower than the lower limit value, that is advantageous to correction of aberrations, but a back focus becomes long. Therefore, it becomes difficult to reduce the size, and that is not desirable.

In the imaging lens according to the embodiment of the present invention, especially when conditional formula (2-1) is also satisfied in the range defined by conditional formula (2), the aforementioned effects are more remarkably achievable.

Further, the imaging lens according to the embodiment of the present invention satisfies the following conditional formula (3). Further, especially conditional formula (3-1) is satisfied in the range defined by conditional formula (3):

$$0.5 < f/f5 < 1.5 \quad (3);\text{ and}$$

$$0.6 < f/f5 < 1.4 \quad (3\text{-}1),\text{ where}$$

f5: a focal length of the 2-3rd lens, and
f: a focal length of an entire system.

Conditional formula (3) defines a relationship between a focal length of an entire system and a focal length of 2-3rd lens L23. If the value exceeds the upper limit value, correction of curvature of field and distortion becomes difficult, and that is not desirable. On the other hand, if the value is lower than the lower limit value, correction of a coma aberration becomes difficult. Further, it becomes impossible to position an exit pupil sufficiently away from an image plane, and that is not desirable.

In the imaging lens according to the embodiment of the present invention, especially when conditional formula (3-1) is also satisfied in the range defined by conditional formula (3), the aforementioned effects are more remarkably achievable.

Further, the imaging lens according to the embodiment of the present invention satisfies the following conditional formula (4). Further, especially conditional formula (4-1) is satisfied in the range defined by conditional formula (4):

$$0.6 < f/fG1 < 1.5 \qquad (4); \text{ and}$$

$$0.7 < f/fG1 < 1.4 \qquad (4\text{-}1), \text{ where}$$

fG1: a focal length of first lens group G1, and
f: a focal length of an entire system.

Conditional formula (4) defines a relationship between a focal length of an entire system and a focal length of first lens group G1. If the value exceeds the upper limit value, correction of a spherical aberration and distortion generated in first lens group G1 becomes difficult, and that is not desirable. On the other hand, if the value is lower than the lower limit value, a focal length of first lens group G1 becomes long, and an optical total length becomes long. If the positive refractive power of second lens group G2 is increased to avoid this problem, it becomes difficult to correct a spherical aberration and a coma aberration in a well-balanced manner, and that is not desirable.

In the imaging lens according to the embodiment of the present invention, especially when conditional formula (4-1) is also satisfied in the range defined by conditional formula (4), the aforementioned effects are more remarkably achievable.

Further, the imaging lens according to the embodiment of the present invention satisfies the following conditional formula (5). Further, especially conditional formula (5-1) is satisfied in the range defined by conditional formula (5):

$$Ndp > 1.75 \qquad (5); \text{ and}$$

$$Ndp > 1.78 \qquad (5\text{-}1), \text{ where}$$

Ndp: an average of refractive indices of 1-2nd lens L12, 2-1st lens L21 and 2-3rd lens L23 for d-line.

Conditional formula (5) defines an average of refractive indices of 1-2nd lens L12, 2-1st lens L21 and 2-3rd lens L23 for d-line. If the value is lower than the lower limit value of conditional formula (5), control of Petzval sum becomes difficult. The optical total length needs to be increased to excellently correct curvature of field, and it becomes difficult to reduce the size, and that is not desirable.

In the imaging lens according to the embodiment of the present invention, especially when conditional formula (5-1) is also satisfied in the range defined by conditional formula (5), the aforementioned effects are more remarkably achievable.

Further, the imaging lens according to the embodiment of the present invention satisfies the following conditional formula (6). Further, especially conditional formula (6-1) is satisfied in the range defined by conditional formula (6):

$$0.3 < f123/f < 0.9 \qquad (6); \text{ and}$$

$$0.4 < f123/f < 0.8 \qquad (6\text{-}1), \text{ where}$$

f123: a combined focal length of 1-1st lens L11, 1-2nd lens L12 and 2-1st lens L21, and
f: a focal length of an entire system.

Conditional formula (6) defines a combined focal length of 1-1st lens L11, 1-2nd lens L12 and 2-1st lens L21. If the value exceeds the upper limit value, the total lens length becomes long, and that is not desirable. On the other hand, if the value is lower than the lower limit value, correction of a spherical aberration for each wavelength becomes difficult. Further, control of Petzval sum becomes difficult, and it becomes difficult to correct curvature of field and astigmatism at the same time in a well-balanced manner, and that is not desirable.

In the imaging lens according to the embodiment of the present invention, especially when conditional formula (6-1) is also satisfied in the range defined by conditional formula (6), the aforementioned effects are more remarkably achievable.

Further, the imaging lens according to the embodiment of the present invention satisfies the following conditional formula (7). Further, especially conditional formula (7-1) is satisfied in the range defined by conditional formula (7):

$$8° < |\alpha| < 20° \qquad (7); \text{ and}$$

$$9° < |\alpha| < 19° \qquad (7\text{-}1), \text{ where}$$

$\alpha$: an angle of a chief ray reaching a maximum image height with respect to an optical axis when the imaging lens is focused on an object at infinity.

Figure 8:
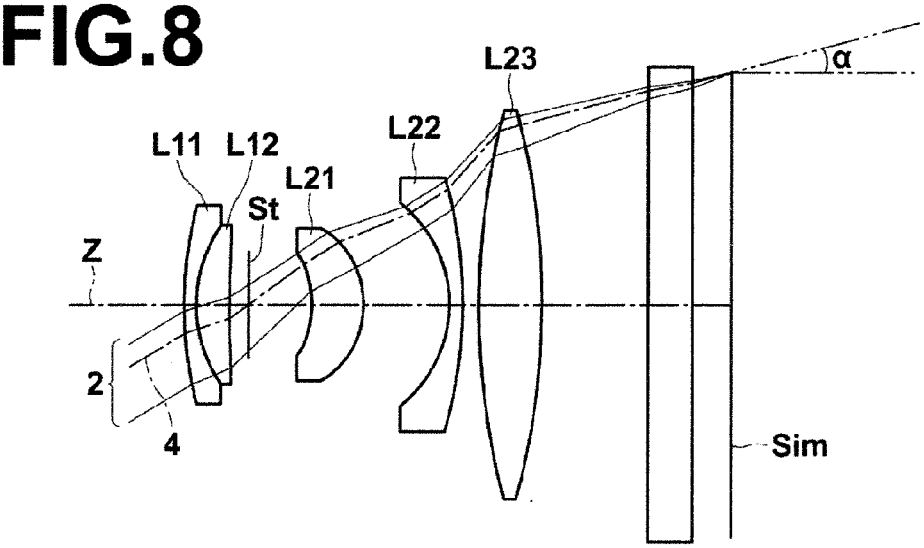
FIG. 8 is a diagram illustrating rays reaching a maximum image height in the imaging lens of Example 1, illustrated in FIG. 1, when the imaging lens is focused on an object at infinity.

Conditional formula (7) defines the range of an angle of a chief ray reaching a maximum image height with respect to an optical axis when the imaging lens is focused on an object at infinity. FIG. 8 illustrates rays reaching a maximum image height in the imaging lens of Example 1, illustrated in FIG. 1, when the imaging lens is focused on an object at infinity. FIG. 8 illustrates rays 2 reaching the maximum image height and a chief ray 4, which is a ray of the rays 2 that passes through the center of aperture stop St. Further, an angle formed by an imaginary line that passes through an intersection of the chief ray 4 and image formation plane Sim and is parallel to optical axis Z and an imaginary line extending from the chief ray 4 is the same as an angle formed by the chief ray reaching the maximum image height and the optical axis. Therefore, the angle formed by these two imaginary lines is illustrated as angle $\alpha$, which is defined in conditional formula (7), on the right side of image formation plane Sim.

If the value exceeds the upper limit value of conditional formula (7), it becomes difficult to capture light at the imaging device, and that is not desirable. On the other hand, if the value is lower than the lower limit value, when optical performance is tried to be secured, a back focus needs to be increased, or a change in the angle of rays passing through each lens needs to be made gradual by lowering the refractive power of lenses arranged on the image side of aperture stop St. Therefore, the diameter of each lens becomes large. Consequently, the size of the lens system become large, and that is not desirable.

In the imaging lens according to the embodiment of the present invention, especially when conditional formula (7-1) is also satisfied in the range defined by conditional formula (7), the aforementioned effects are more remarkably achievable.

Further, the imaging lens according to the embodiment of the present invention satisfies the following conditional formula (8). Further, especially conditional formula (8-1) is satisfied in the range defined by conditional formula (8):

$$0.35 < Y/f < 0.70 \quad (8); \text{ and}$$

$$0.40 < Y/f < 0.65 \quad (8\text{-}1), \text{ where}$$

Y: a maximum image height, and
f: a focal length of an entire system.

Here, maximum image height Y may be determined based on the specification of lens design, the specification of an apparatus on which the lens is mounted, and the like.

Conditional formula (8) defines a relationship between a maximum image height and a focal length of an entire system. If the value exceeds the upper limit value, the focal length becomes short. Therefore, correction of curvature of field and a lateral chromatic aberration becomes difficult, and that is not desirable. On the other hand, if the value is lower than the lower limit value, a focal length becomes long, and it becomes difficult to reduce the thickness, and that is not desirable.

In the imaging lens according to the embodiment of the present invention, especially when conditional formula (8-1) is also satisfied in the range defined by conditional formula (8), the aforementioned effects are more remarkably achievable.

Further, the imaging lens according to the embodiment of the present invention satisfies the following conditional formula (9). Further, especially conditional formula (9-1) is satisfied in the range defined by conditional formula (9):

$$0.70 < ST/TL < 0.95 \quad (9); \text{ and}$$

$$0.75 < ST/TL < 0.95 \quad (9\text{-}1), \text{ where}$$

ST: a distance on an optical axis from a stop to an image plane, and
TL: a distance on the optical axis from a most-object-side lens surface in an entire system to the image plane (a back focus portion is a distance in air).

Conditional formula (9) defines a ratio of a distance from the position of a stop to an image formation plane to an optical total length. If the value exceeds the upper limit value, a space for lenses arranged on the object side of the stop becomes narrow. Therefore, the number of lenses needs to be reduced, or the curvature of a lens or lenses is forced to be reduced. Therefore, correction of various aberrations becomes difficult, and that is not desirable. On the other hand, if the value is lower than the lower limit value, the position of the stop becomes close to the imaging device. Therefore, the angle of incidence of rays entering the imaging device becomes large, and that is not desirable.

In the imaging lens according to the embodiment of the present invention, especially when conditional formula (9-1) is also satisfied in the range defined by conditional formula (9), the aforementioned effects are more remarkably achievable.

Next, examples of the imaging lens of the present invention will be described, and in particular, numerical value examples will be mainly described in detail.

Example 1

FIG. 1 is a diagram illustrating the arrangement of lens groups in an imaging lens of Example 1. Since the lens groups and each lens in the structure of FIG. 1 were described in detail already, explanations will not be repeated in the following descriptions, unless especially necessary.

Table 1 shows basic lens data on the imaging lens of Example 1. Here, data including optical member PP are shown. In Table 1, column Si shows the surface number of the i-th surface (i=1, 2, 3, . . . ). The object-side surface of a composition element located closest to the object side is the first surface, and surface numbers are assigned to composition elements in such a manner to sequentially increase toward the image side. Column Ri shows the curvature radius of the i-th surface, and column Di shows a distance on optical axis Z between the i-th surface and the (i+1)th surface. Column Ndj shows the refractive index of the j-th composition element (j=1, 2, 3, . . . ) for d-line (wavelength is 587.6 nm). A composition element closest to the object side is the first composition element, and the number j sequentially increases toward the image side. Column vdj shows the Abbe number of the j-th composition element for d-line. Here, the basic lens data including aperture stop St are shown. In the column of curvature radius, the sign of ∞ (STOP) is written for a surface corresponding to aperture stop St.

In Table 1, the unit of values of curvature radius R and surface distance D is mm. In Table 1, numerical values rounded at predetermined digits are written. The sign of a curvature radius is positive when a surface shape is convex toward the object side, and negative when a surface shape is convex toward the image side.

In the lens data of Table 1, the mark of "*" is attached to the surface number of an aspherical surface, and the numerical value of a paraxial curvature radius is shown, as the curvature radius of the aspherical surface. Further, focal length f of the entire lens system and FNo. are also shown at the bottom of Table 1.

The description method in Table 1, as described so far, is similar also in Tables 3, 5, 7, 9, 11 and 13, which will be described later.

Table 2 shows aspherical surface data on the imaging lens of Example 1. Here, the aspherical surface data show the surface numbers of aspherical surfaces and aspherical surface coefficients about the aspherical surfaces. Here, the numerical value of "E-n" (n: integer) of the aspherical surface coefficient means "×10$^{-n}$". The aspherical surface coefficients are values of coefficients KA, Am (m=3, 4, 5, . . . 10) in the following aspherical equation:

$$Zd = C \cdot h^2 / \{1 + (1 - KA \cdot C^2 \cdot h^2)^{1/2}\} + \Sigma Am \cdot h^m, \text{ where}$$

Zd: depth of an aspherical surface (the length of a perpendicular from a point on the aspherical surface at height h to a plane that contacts with the vertex of the aspherical surface and is perpendicular to the optical axis), h: height (the length from the optical axis to the lens surface), C: the reciprocal of a paraxial curvature radius, and KA, Am: aspherical surface coefficients (m=3, 4, 5, . . . 10).

The description method in Table 2, as described so far, is similar also in Tables 4, 6, 8, 10, 12 and 14, which will be described later.

In all tables that will be described hereinafter, "mm" is used as the unit of length, as described above, and degree (°) is used as the unit of angle. However, since an optical system is usable by proportionally enlarging or proportionally reducing the optical system, other appropriate units may be used.

TABLE 1

EXAMPLE 1. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 25.3462 | 0.76 | 1.761821 | 26.52 |
| 2 | 8.7504 | 2.10 | 1.882997 | 40.76 |
| 3 | 87.4617 | 1.66 | | |
| 4 | ∞(STOP) | 4.00 | | |
| *5 | −6.9610 | 3.30 | 1.677900 | 54.89 |
| *6 | −5.7754 | 5.40 | | |
| 7 | −8.1729 | 0.85 | 1.805181 | 25.42 |
| 8 | −28.4698 | 1.00 | | |
| 9 | 47.8788 | 4.00 | 1.882997 | 40.76 |
| 10 | −46.2419 | 1.66 | | |
| 11 | ∞ | 2.80 | 1.550000 | 55.00 |
| 12 | ∞ | | | |

*ASPHERICAL SURFACE
f = 25.471
FNo. = 3.50

TABLE 2

EXAMPLE 1. ASPHERICAL SURFACE DATA

| ASPHERICAL SURFACE COEFFICIENT • S5 | |
|---|---|
| KA | 1.00000000 |
| A3 | 9.25875659E−03 |
| A4 | −1.14467380E−02 |
| A5 | 5.17948801E−03 |
| A6 | −5.54598496E−04 |
| A7 | −4.42790802E−04 |
| A8 | 1.36659292E−04 |
| A9 | −2.87112441E−06 |
| A10 | −2.29001336E−06 |
| ASPHERICAL SURFACE COEFFICIENT • S6 | |
| KA | 1.00000000 |
| AS | 6.48127911E−03 |
| A4 | −5.46805538E−03 |
| A5 | 1.69554769E−03 |
| A6 | −8.34085892E−06 |
| A7 | −8.73763869E−05 |
| A8 | 1.77731235E−06 |
| A9 | 4.48264056E−06 |
| A10 | −5.60010282E−07 |

Figure 9:
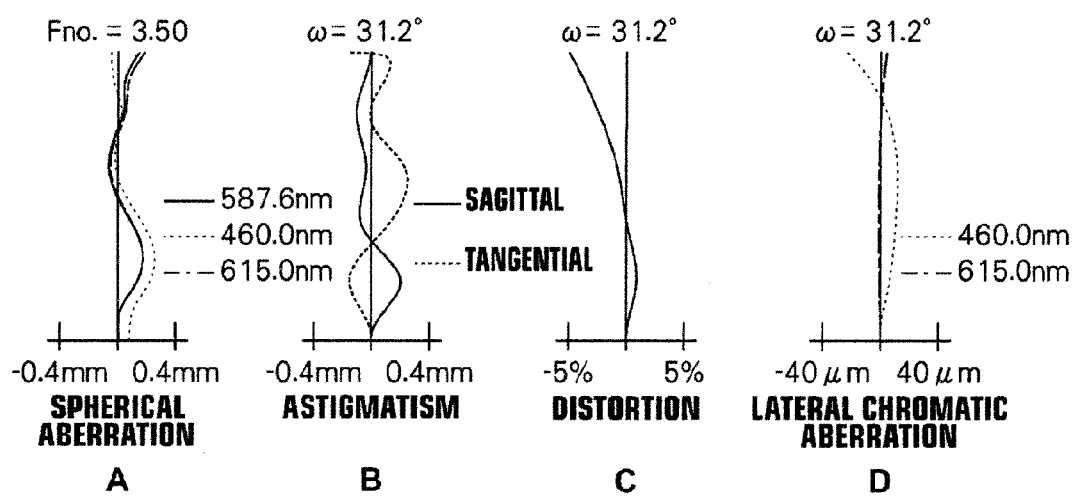
FIG. 9, Sections A through D are aberration diagrams of the imaging lens according to Example 1 of the present invention.

Here, a spherical aberration, astigmatism, distortion and a lateral chromatic aberration of the imaging lens of Example 1 at infinity focus are illustrated in FIG. 9, Sections A through D, respectively. Each aberration is based on d-line (wavelength is 587.6 nm). The diagram of the spherical aberration illustrates aberrations also for the wavelengths of 460.0 nm and 615.0 nm. Especially, the diagram of the lateral chromatic aberration illustrates aberrations for the wavelengths of 460.0 nm and 615.0 nm. In the diagram of the astigmatism, an aberration for a sagittal direction is indicated by a solid line, and an aberration for a tangential direction is indicated by a broken line. In the diagram of the spherical aberration, FNo. represents F-number, and in the other diagrams, ω represents a half angle of view. The representation method of aberrations, as described so far, is similar also in FIG. 10 through FIG. 15, which will be described later.

Example 2

Figure 2:
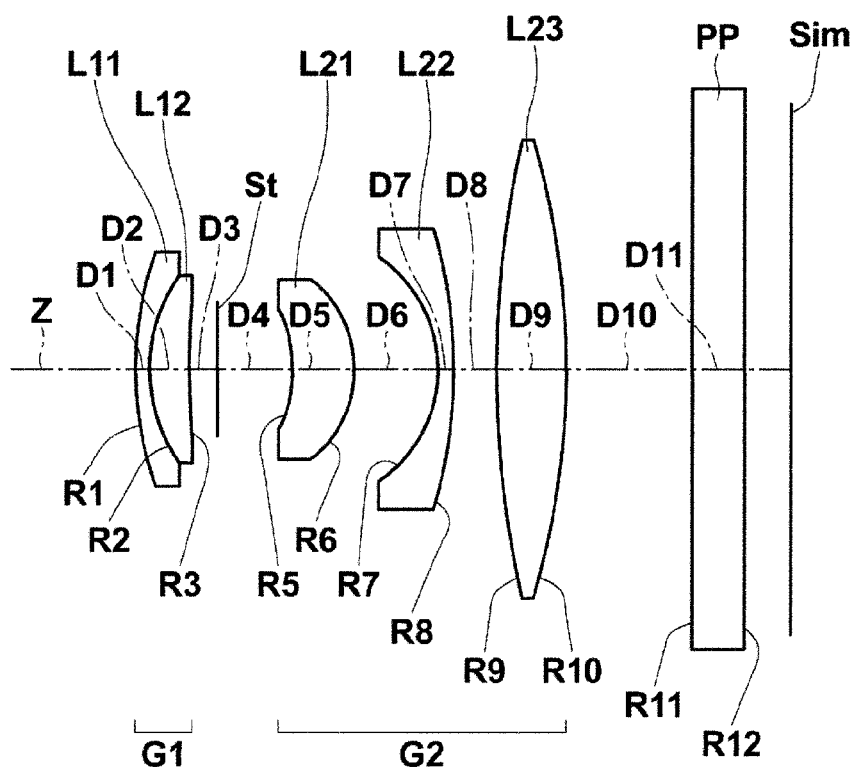
FIG. 2 is a cross section illustrating the lens structure of an imaging lens according to Example 2 of the present invention.
Figure 10:
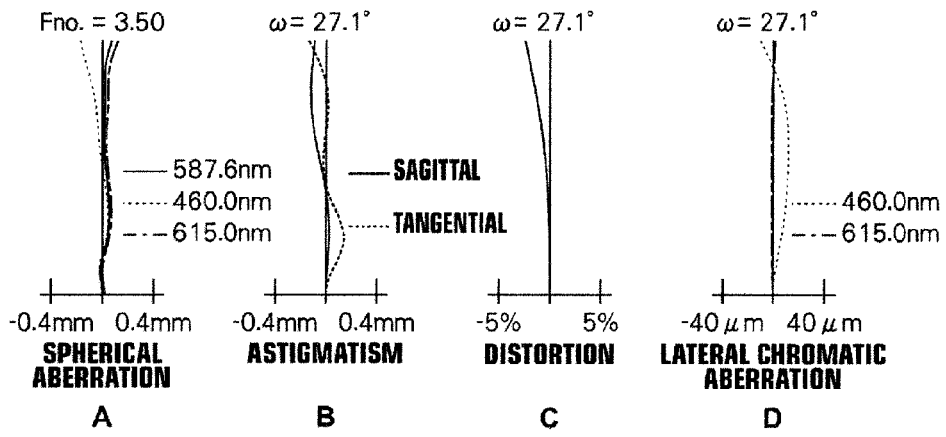
FIG. 10, Sections A through D are aberration diagrams of the imaging lens according to Example 2 of the present invention.

FIG. 2 is a diagram illustrating the arrangement of lens groups in the imaging lens of Example 2. Table 3 shows basic lens data on the imaging lens of Example 2. Table 4 shows aspherical surface data on the imaging lens of Example 2. FIG. 10, Sections A through D are aberration diagrams of the imaging lens of Example 2.

TABLE 3

EXAMPLE 2. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 18.7609 | 0.75 | 1.761821 | 26.52 |
| 2 | 8.7504 | 2.10 | 1.882997 | 40.76 |
| 3 | 50.3912 | 2.49 | | |
| 4 | ∞(STOP) | 4.00 | | |
| *5 | −8.4234 | 3.30 | 1.677900 | 54.89 |
| *6 | −6.4941 | 4.44 | | |
| 7 | −7.3258 | 0.85 | 1.805181 | 25.42 |
| 8 | −26.4650 | 2.28 | | |
| 9 | 56.4290 | 3.70 | 1.903658 | 31.32 |
| 10 | −43.4934 | 2.49 | | |
| 11 | ∞ | 2.80 | 1.550000 | 55.00 |
| 12 | ∞ | | | |

*ASPHERICAL SURFACE
f = 23.381
FNo. = 3.50

TABLE 4

EXAMPLE 2. ASPHERICAL SURFACE DATA

| ASPHERICAL SURFACE COEFFICIENT • S5 | |
|---|---|
| KA | 1.00000000 |
| A3 | −2.80413432E−04 |
| A4 | −3.21782558E−04 |
| A5 | −4.73048920E−04 |
| A6 | 4.98281764E−04 |
| A7 | −3.26933905E−04 |
| A8 | 1.05556489E−04 |
| A9 | −1.63651243E−06 |
| A10 | 8.00251069E−07 |
| ASPHERICAL SURFACE COEFFICIENT • S6 | |
| KA | 1.00000000 |
| A3 | −5.44511891E−04 |
| A4 | 9.93357528E−04 |
| A5 | −9.60450139E−04 |
| A6 | 3.89753049E−04 |
| A7 | −6.86195012E−06 |
| A8 | −2.66963012E−06 |
| A9 | 2.54138068E−06 |
| A10 | −2.59720615E−07 |

Example 3

Figure 3:
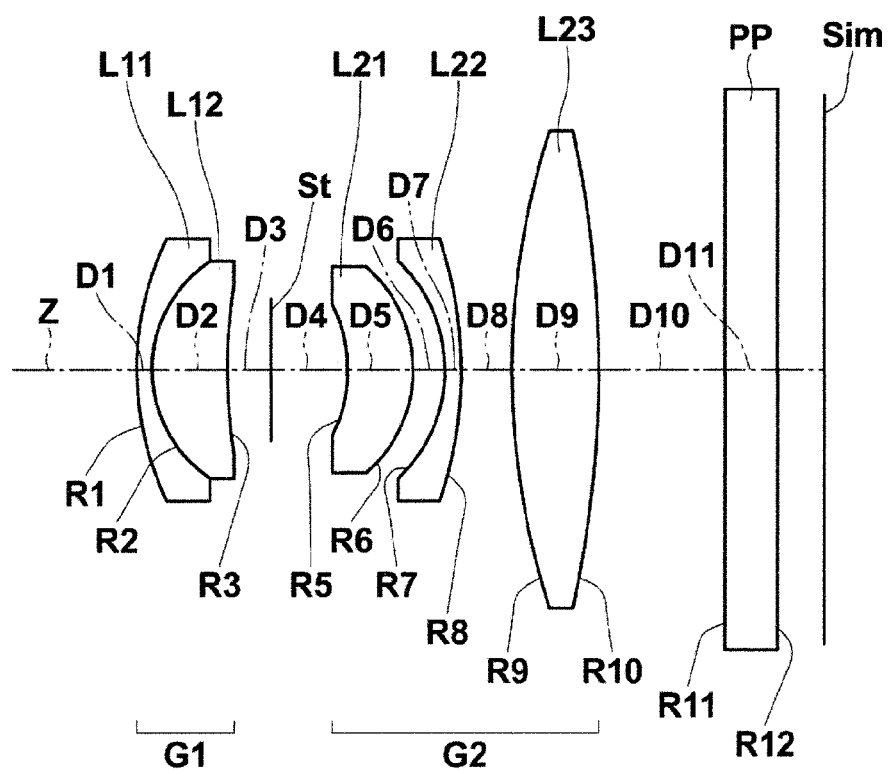
FIG. 3 is a cross section illustrating the lens structure of an imaging lens according to Example 3 of the present invention.
Figure 11:
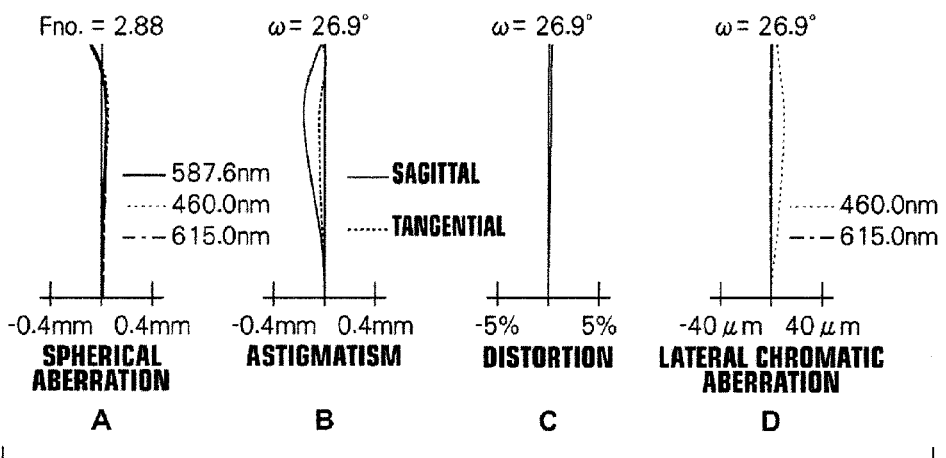
FIG. 11, Sections A through D are aberration diagrams of the imaging lens according to Example 3 of the present invention.

FIG. 3 is a diagram illustrating the arrangement of lens groups in the imaging lens of Example 3. Table 5 shows basic lens data on the imaging lens of Example 3. Table 6 shows aspherical surface data on the imaging lens of Example 3. FIG. 11, Sections A through D are aberration diagrams of the imaging lens of Example 3.

TABLE 5

EXAMPLE 3. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 16.3942 | 0.81 | 1.728250 | 28.46 |
| 2 | 7.0008 | 4.00 | 1.882997 | 40.76 |

TABLE 5-continued

EXAMPLE 3. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 3 | 29.9374 | 2.49 | | |
| 4 | ∞(STOP) | 4.08 | | |
| *5 | −8.3879 | 3.50 | 1.803480 | 40.45 |
| 6 | −7.3035 | 1.70 | | |
| 7 | −8.0000 | 0.85 | 1.784723 | 25.68 |
| 8 | −22.1257 | 2.73 | | |
| 9 | 41.4637 | 4.60 | 1.834807 | 42.71 |
| 10 | −60.5743 | 2.49 | | |
| 11 | ∞ | 2.80 | 1.550000 | 55.00 |
| 12 | ∞ | | | |

*ASPHERICAL SURFACE
f = 28.775
FNo. = 2.88

TABLE 6

EXAMPLE 3. ASPHERICAL SURFACE DATA
ASPHERICAL SURFACE COEFFICIENT • S5

| KA | 1.00000000 |
|---|---|
| A3 | −2.28842467E−05 |
| A4 | −2.24042350E−04 |
| A5 | −2.78103185E−05 |
| A6 | 2.07187001E−06 |
| A7 | −3.29891731E−06 |
| A8 | 1.58262768E−06 |
| A9 | −4.14992777E−07 |
| A10 | 3.08397746E−08 |

Example 4

Figure 4:
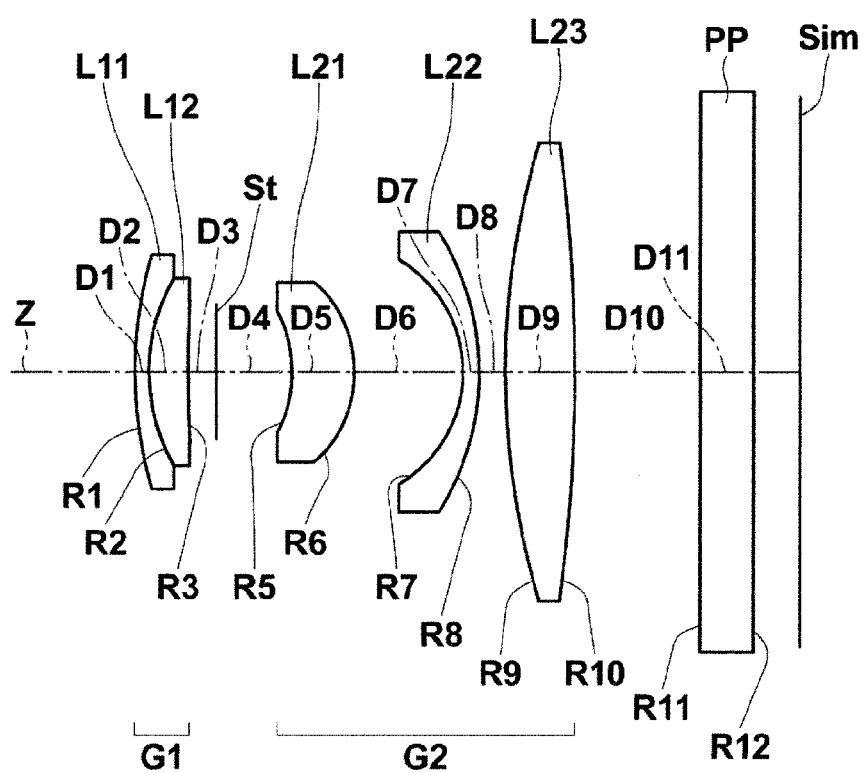
FIG. 4 is a cross section illustrating the lens structure of an imaging lens according to Example 4 of the present invention.
Figure 12:
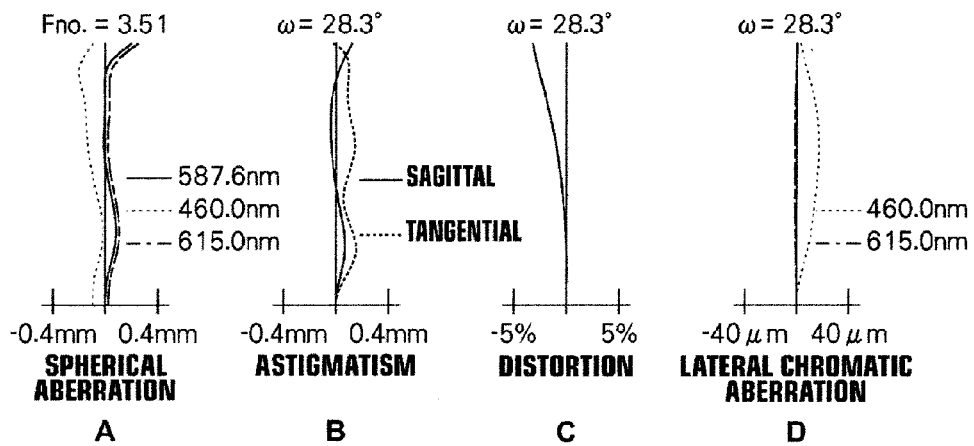
FIG. 12, Sections A through D are aberration diagrams of the imaging lens according to Example 4 of the present invention.

FIG. 4 is a diagram illustrating the arrangement of lens groups in the imaging lens of Example 4. Table 7 shows basic lens data on the imaging lens of Example 4. Table 8 shows aspherical surface data on the imaging lens of Example 4. FIG. 12, Sections A through D are aberration diagrams of the imaging lens of Example 4.

TABLE 7

EXAMPLE 4. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 22.1613 | 0.76 | 1.761821 | 26.52 |
| 2 | 10.0000 | 2.10 | 1.882997 | 40.76 |
| 3 | 95.6598 | 2.51 | | |
| 4 | ∞(STOP) | 4.00 | | |
| *5 | −7.7107 | 3.30 | 1.677903 | 54.89 |
| *6 | −6.8653 | 5.81 | | |
| 7 | −6.9822 | 0.85 | 1.805181 | 25.42 |
| 8 | −14.1660 | 1.40 | | |
| 9 | 42.8640 | 3.70 | 1.882997 | 40.76 |
| 10 | −93.2048 | 2.51 | | |
| 11 | ∞ | 2.80 | 1.550000 | 55.00 |
| 12 | ∞ | | | |

*ASPHERICAL SURFACE
f = 28.114
FNo. = 3.51

TABLE 8

EXAMPLE 4. ASPHERICAL SURFACE DATA
ASPHERICAL SURFACE COEFFICIENT • S5

| KA | 1.00000000 |
|---|---|
| A3 | 1.73094199E−04 |
| A4 | −4.58724390E−04 |
| A5 | −4.50803947E−04 |
| A6 | 6.31577806E−04 |
| A7 | −3.89467668E−04 |
| A8 | 1.12510035E−04 |
| A9 | −1.45680455E−05 |
| A10 | 4.57454529E−07 |

ASPHERICAL SURFACE COEFFICIENT • S6

| KA | 1.00000000 |
|---|---|
| A3 | −5.51646389E−07 |
| A4 | 4.79779713E−04 |
| A5 | −7.50858345E−04 |
| A6 | 3.61911192E−04 |
| A7 | −7.03863703E−05 |
| A8 | −2.43222343E−06 |
| A9 | 2.66390237E−06 |
| A10 | −2.72023725E−07 |

Example 5

Figure 5:
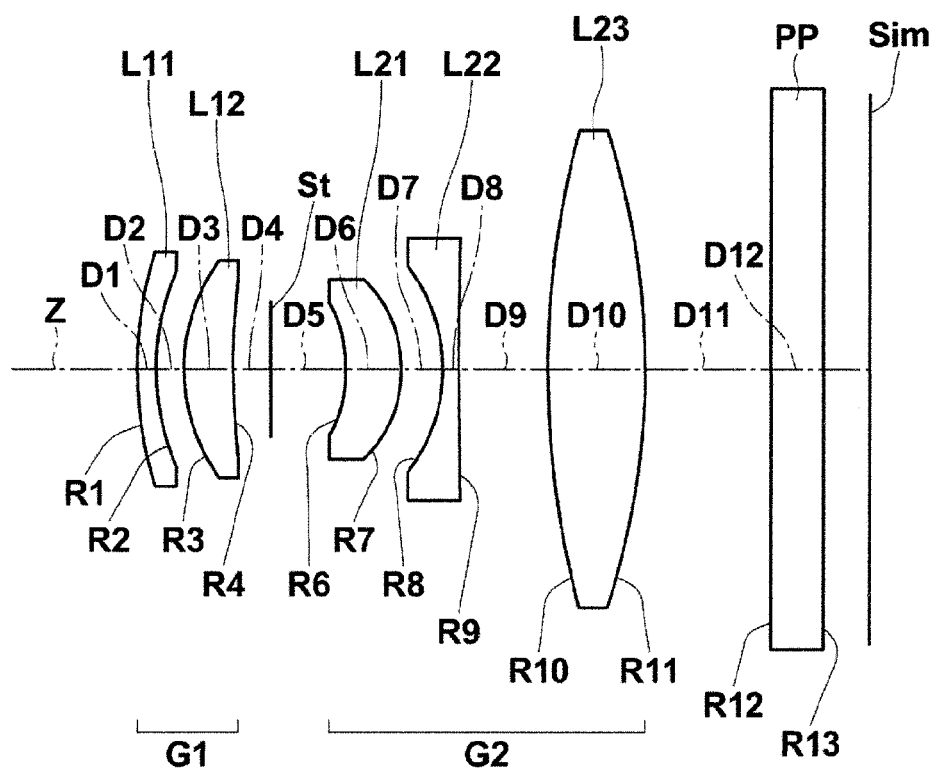
FIG. 5 is a cross section illustrating the lens structure of an imaging lens according to Example 5 of the present invention.
Figure 13:
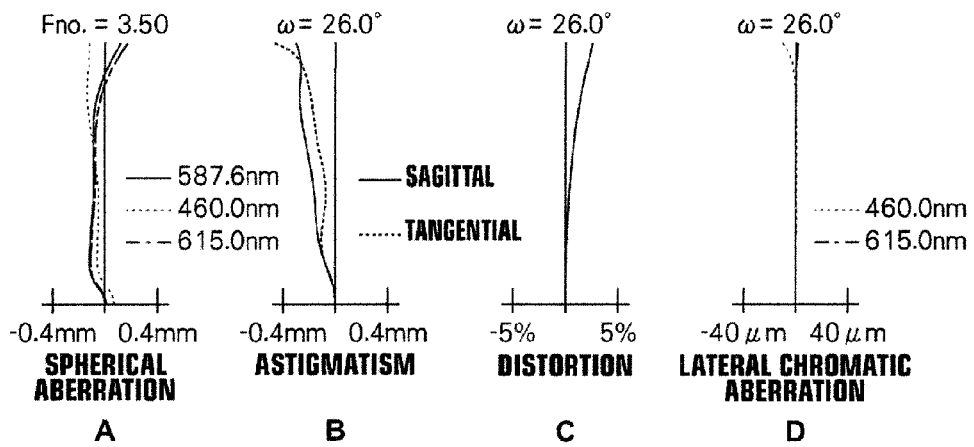
FIG. 13, Sections A through D are aberration diagrams of the imaging lens according to Example 5 of the present invention.

FIG. 5 is a diagram illustrating the arrangement of lens groups in the imaging lens of Example 5. Table 9 shows basic lens data on the imaging lens of Example 5. Table 10 shows aspherical surface data on the imaging lens of Example 5. FIG. 13, Sections A through D are aberration diagrams of the imaging lens of Example 5.

TABLE 9

EXAMPLE 5. BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 20.9219 | 1.00 | 1.922860 | 18.90 |
| 2 | 13.1018 | 1.50 | | |
| 3 | 10.0000 | 2.60 | 1.882997 | 40.76 |
| 4 | 39.5181 | 2.48 | | |
| 5 | ∞(STOP) | 4.00 | | |
| *6 | −8.9629 | 3.00 | 1.803480 | 40.45 |
| *7 | −6.8958 | 2.20 | | |
| 8 | −9.0979 | 0.85 | 1.761821 | 26.52 |
| 9 | 306.4999 | 4.70 | | |
| 10 | 49.0978 | 5.20 | 1.882997 | 40.76 |
| 11 | −41.2367 | 2.48 | | |
| 12 | ∞ | 2.80 | 1.550000 | 55.00 |
| 13 | ∞ | | | |

*ASPHERICAL SURFACE
f = 29.256
FNo. = 3.50

EXAMPLE 5. ASPHERICAL SURFACE DATA
ASPHERICAL SURFACE COEFFICIENT • S6

| KA | 1.00000000 |
|---|---|
| A3 | 8.77582480E−04 |
| A4 | −1.51652001E−03 |
| A5 | 2.76817992E−04 |
| A6 | 8.24763455E−06 |
| A7 | −3.87235760E−05 |
| A8 | 7.03965729E−06 |
| A9 | −1.04599428E−07 |

-continued

EXAMPLE 5. ASPHERICAL SURFACE DATA

| | |
|---|---|
| A10 | −7.01576590E−08 |
| ASPHERICAL SURFACE COEFFICIENT • S7 | |
| KA | 1.00000000 |
| A3 | 2.25777390E−04 |
| A4 | −1.69236280E−04 |
| A5 | −2.03990051E−06 |
| A6 | −1.58872888E−07 |
| A7 | 8.09765172E−07 |
| A8 | −1.64028689E−07 |
| A9 | −6.51270886E−08 |
| A10 | 1.02350883E−08 |

Example 6

Figure 6:
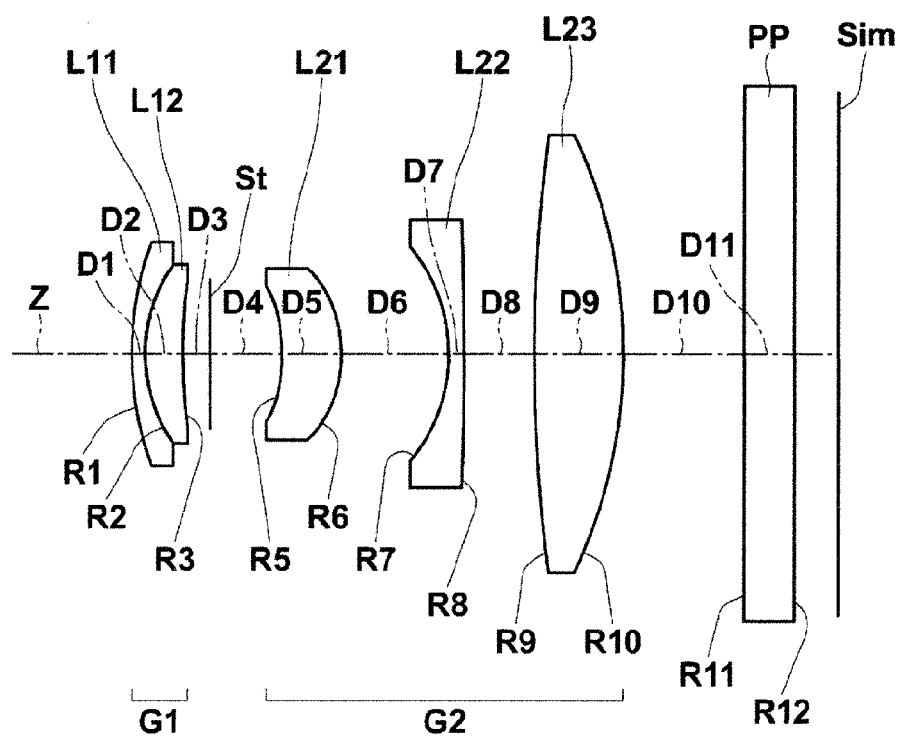
FIG. 6 is a cross section illustrating the lens structure of an imaging lens according to Example 6 of the present invention.
Figure 14:
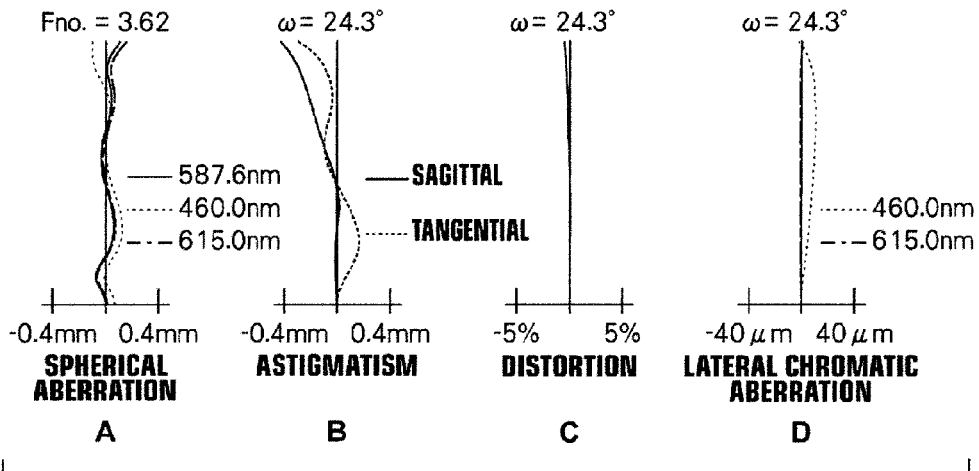
FIG. 14, Sections A through D are aberration diagrams of the imaging lens according to Example 6 of the present invention.

FIG. 6 is a diagram illustrating the arrangement of lens groups in the imaging lens of Example 6. Table 11 shows basic lens data on the imaging lens of Example 6. Table 12 shows aspherical surface data on the imaging lens of Example 6. FIG. 14, Sections A through D are aberration diagrams of the imaging lens of Example 6.

TABLE 11

EXAMPLE 6. BASIC LENS DATA

| Si (SURFACE NUMBER) | Ri (CURVA- TURE RADIUS) | Di (SURFACE DISTANCE) | Ndj (RE- FRACTIVE INDEX) | vdj (ABBE NUMBER) |
|---|---|---|---|---|
| 1 | 18.1410 | 0.76 | 1.761821 | 26.52 |
| 2 | 8.7504 | 2.10 | 1.882997 | 40.76 |
| 3 | 32.5561 | 2.48 | | |
| 4 | ∞(STOP) | 4.00 | | |
| *5 | −10.9381 | 3.30 | 1.677900 | 54.89 |
| *6 | −7.6245 | 6.00 | | |
| 7 | −9.4783 | 0.85 | 1.805181 | 25.42 |
| 8 | −200.3019 | 3.93 | | |
| 9 | 93.7640 | 5.00 | 1.903658 | 31.32 |
| 10 | −28.6724 | 2.48 | | |
| 11 | ∞ | 2.80 | 1.550000 | 55.00 |
| 12 | ∞ | | | |

*ASPHERICAL SURFACE
f = 32.553
FNo. = 3.62

TABLE 12

EXAMPLE 6. ASPHERICAL SURFACE DATA

| ASPHERICAL SURFACE COEFFICIENT • S5 | |
|---|---|
| KA | 1.00000000 |
| A3 | 1.89563757E−04 |
| A4 | −6.29014789E−04 |
| A5 | −5.09921270E−04 |
| A6 | 6.71198606E−04 |
| A7 | −3.91089495E−04 |
| A8 | 1.11477354E−04 |
| A9 | −1.55007891E−05 |
| A10 | 7.88361241E−07 |
| ASPHERICAL SURFACE COEFFICIENT • S6 | |
| KA | 1.00000000 |
| A3 | −3.88180382E−04 |
| A4 | 9.31474651E−04 |
| A5 | −9.66330793E−04 |
| A6 | 3.73661852E−04 |
| A7 | −5.64524663E−05 |
| A8 | −4.38546536E−06 |

TABLE 12-continued

EXAMPLE 6. ASPHERICAL SURFACE DATA

| A9 | 2.26296097E−06 |
|---|---|
| A10 | −1.92251639E−07 |

Example 7

Figure 7:
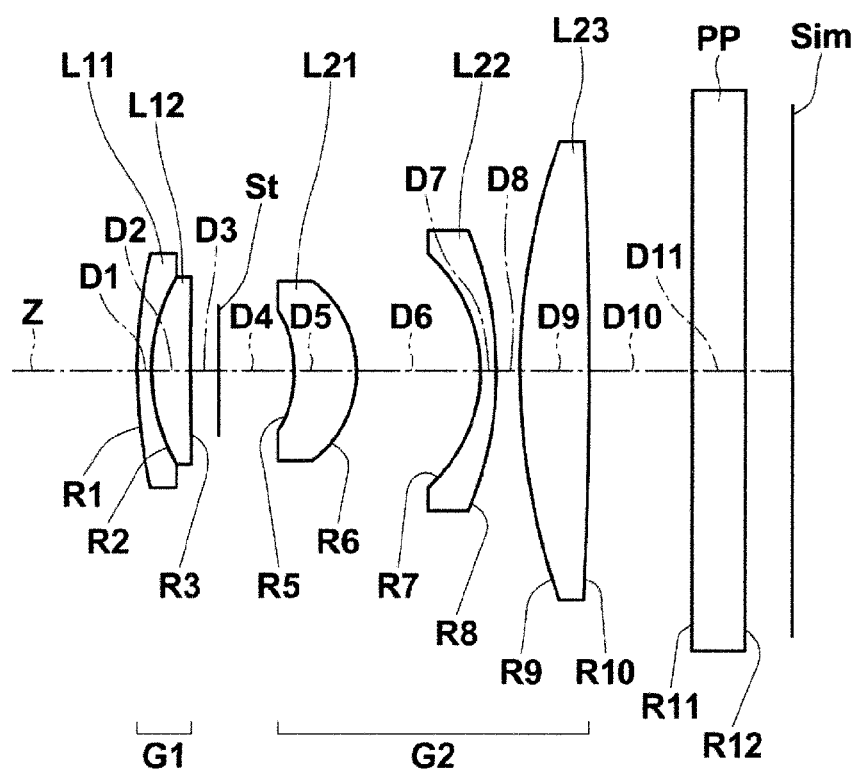
FIG. 7 is a cross section illustrating the lens structure of an imaging lens according to Example 7 of the present invention.
Figure 15:
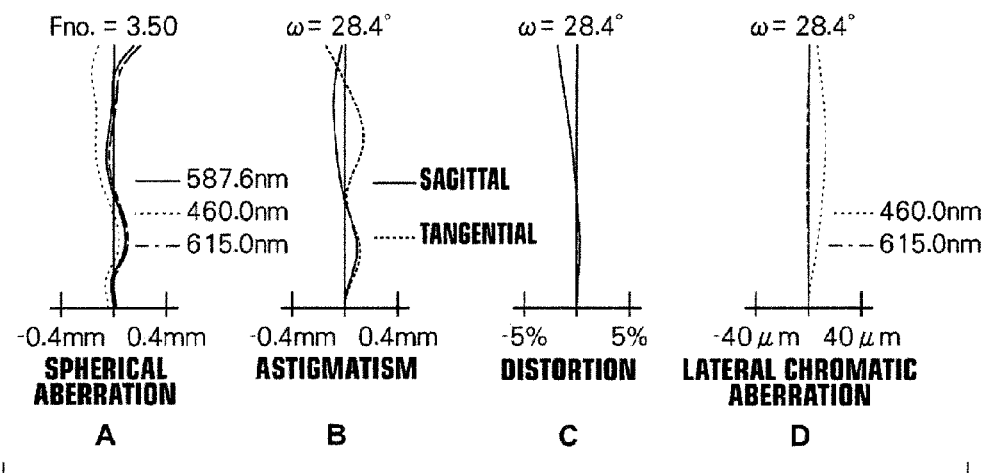
FIG. 15, Sections A through D are aberration diagrams of the imaging lens according to Example 7 of the present invention.

FIG. 7 is a diagram illustrating the arrangement of lens groups in the imaging lens of Example 7. Table 13 shows basic lens data on the imaging lens of Example 7. Table 14 shows aspherical surface data on the imaging lens of Example 7. FIG. 15, Sections A through D are aberration diagrams of the imaging lens of Example 7.

TABLE 13

EXAMPLE 7. BASIC LENS DATA

| Si (SURFACE NUMBER) | Ri (CURVA- TURE RADIUS) | Di (SURFACE DISTANCE) | Ndj (RE- FRACTIVE INDEX) | vdj (ABBE NUMBER) |
|---|---|---|---|---|
| 1 | 27.8203 | 0.76 | 1.761821 | 26.52 |
| 2 | 10.0000 | 2.10 | 1.882997 | 40.76 |
| 3 | 188.4539 | 2.52 | | |
| 4 | ∞(STOP) | 4.00 | | |
| *5 | −7.1450 | 3.30 | 1.677900 | 54.89 |
| *6 | −6.2830 | 6.61 | | |
| 7 | −8.3927 | 0.85 | 1.805181 | 25.42 |
| 8 | −19.5415 | 1.25 | | |
| 9 | 36.6393 | 3.70 | 1.834807 | 42.71 |
| 10 | −250.0000 | 2.52 | | |
| 11 | ∞ | 2.30 | 1.550000 | 55.00 |
| 12 | ∞ | | | |

*ASPHERICAL SURFACE
f = 26.679
FNo. = 3.50

TABLE 14

EXAMPLE 7. ASPHERICAL SURFACE DATA

| ASPHERICAL SURFACE COEFFICIENT • S5 | |
|---|---|
| KA | 1.00000000E+00 |
| A3 | 3.09590698E−03 |
| A4 | −5.29738361E−03 |
| A5 | 3.41600678E−03 |
| A6 | −1.00840627E−03 |
| A7 | −1.52802256E−04 |
| A8 | 1.73201999E−04 |
| A9 | −4.08656777E−05 |
| A10 | 3.09986608E−06 |
| ASPHERICAL SURFACE COEFFICIENT • S6 | |
| KA | 1.00000000E+00 |
| A3 | 1.72069478E−03 |
| A4 | −1.26446970E−03 |
| A5 | 1.78762977E−04 |
| A6 | 1.20682762E−04 |
| A7 | −4.91077993E−05 |
| A8 | 1.45038466E−06 |
| A9 | 1.60560243E−06 |
| A10 | −1.99663630E−07 |

Further, Table 15 shows conditions defined by the aforementioned conditional formulas (1) through (9), in other words, values of the literal parts of the expressions for each of Examples 1 through 7. Table 15 shows values for d-line. As Table 15 shows, all of the imaging lenses of Examples 1 through 7 satisfy all of conditional formulas (1) through (9). Further, they satisfy all of conditional formulas (1-1) through (9-1), which define more desirable ranges than the ranges defined by conditional formulas (1) through (9). Therefore, effects as described already in detail are achievable.

TABLE 15

VALUES ABOUT CONDITIONAL FORMULAS

|  | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| (1) f/|f4| | 1.77 | 2.23 | 1.77 | 1.57 | 2.55 | 2.65 | 1.42 |
| (2) f/f 3 | 1.09 | 1.15 | 1.01 | 0.79 | 1.30 | 1.24 | 0.89 |
| (3) f/f 5 | 0.94 | 1.03 | 0.96 | 0.84 | 1.00 | 1.32 | 0.70 |
| (4) f/f G 1 | 0.87 | 1.08 | 1.19 | 1.06 | 1.30 | 1.00 | 0.93 |
| (5) N d p | 1.81 | 1.82 | 1.84 | 1.81 | 1.81 | 1.82 | 1.80 |
| (6) f 1 2 3/f | 0.67 | 0.59 | 0.66 | 0.70 | 0.53 | 0.57 | 0.71 |
| (7) |α| | 15.11 | 16.51 | 13.73 | 15.67 | 10.79 | 13.00 | 17.45 |
| (8) Y/f | 0.57 | 0.50 | 0.51 | 0.52 | 0.50 | 0.45 | 0.53 |
| (9) S T/T L | 0.88 | 0.87 | 0.80 | 0.87 | 0.87 | 0.89 | 0.87 |

FIG. 1 illustrates a case in which optical member PP is arranged between a lens system and image formation plane Sim. Instead of arranging there various filters, such as a low-pass filter and a filter that cuts a specific wavelength band, or the like, these various filters may be arranged between lenses. Alternatively, a coating having an action similar to that of various filters may be applied to a lens surface of one of the lenses.

Figure 16:
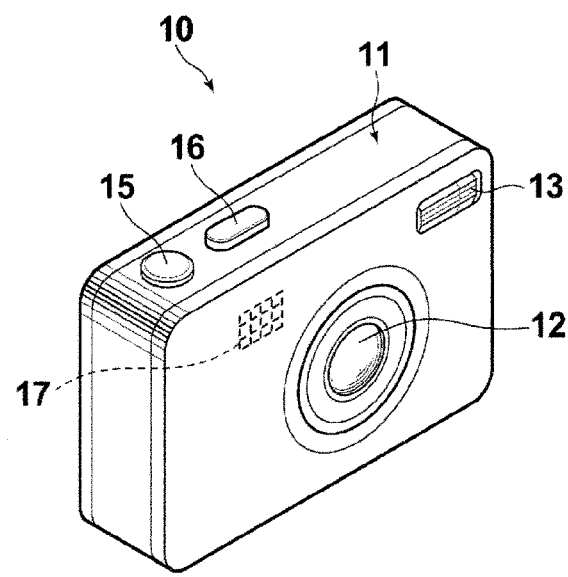
FIG. 16 is a schematic diagram illustrating the configuration of an imaging apparatus according to an embodiment of the present invention.

Next, an imaging apparatus according to the present invention will be described. FIG. 16 is a perspective view illustrating the shape of a camera according to an embodiment of the present invention. A camera 10, which is illustrated here, is a compact digital camera. A small-size imaging lens 12 according to an embodiment of the present invention is provided on the front surface and in the inside of a camera body 11. A flash output device 13 for outputting flash to a subject is provided on the front surface of the camera body 11. A shutter button 15 and a power source button 16 are provided on the upper surface of the camera body 11, and an imaging device 17 is provided in the inside of the camera body 11. The imaging device 17 images an optical image formed by the small-size imaging lens 12, and converts the optical image into electrical signals. For example, the imaging device 17 is composed of a CCD, a CMOS or the like.

As described above, the size of the imaging lens 12 according to the embodiment of the present invention is sufficiently reduced. Therefore, even if a collapsible mount type camera is not adopted as the camera 10, it is possible to make the camera 10 compact both when the camera 10 is being carried and when photography is performed. Further, when a collapsible mount type camera is adopted, it is possible to reduce the size of the camera even more and to improve the portability, compared with conventional collapsible mount type cameras. Further, the camera 10 to which the imaging lens 12 according to the present invention has been applied can perform photography with high image qualities.

Figure 17A:
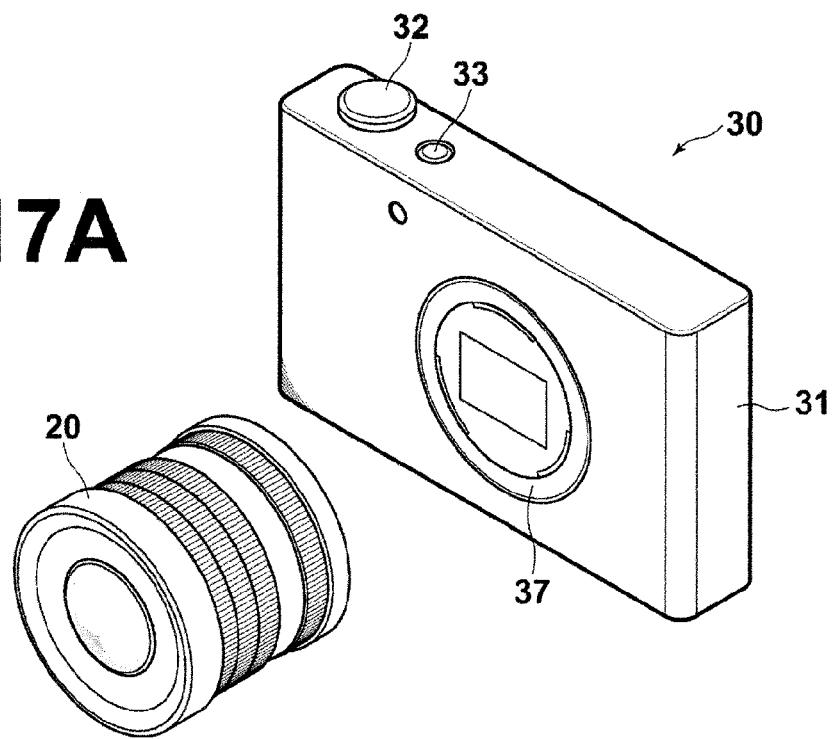
FIG. 17A is a schematic diagram illustrating the configuration of an imaging apparatus according to another embodiment of the present invention.
Figure 17B:
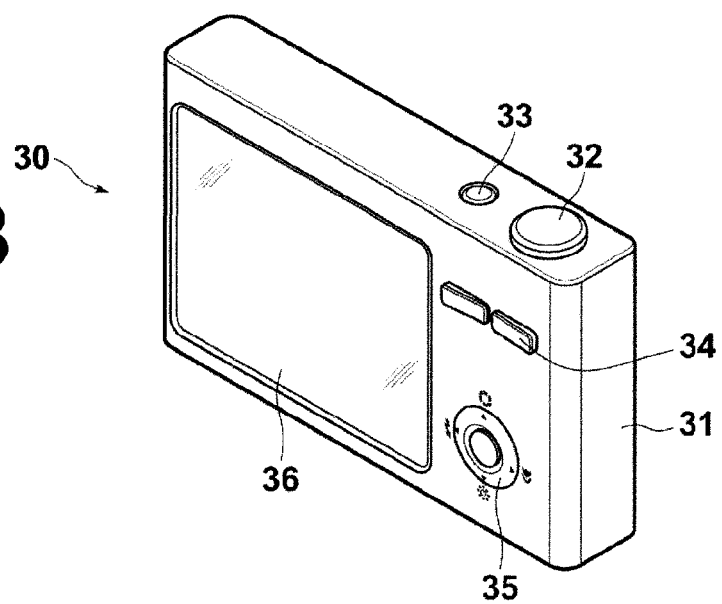
FIG. 17B is a schematic diagram illustrating the configuration of the imaging apparatus according to the other embodiment of the present invention.

Next, an imaging apparatus according to another embodiment of the present invention will be described with reference to FIGS. 17A and 17B. A camera 30, the shape of which is illustrated here in a perspective view, is a so-called mirrorless single-lens type digital still camera, on which an interchangeable lens 20 is detachably mountable. FIG. 17A is an external view of the camera 30 viewed from the front side, and FIG. 17B is an external view of the camera 30 viewed from the back side.

This camera 30 includes a camera body 31, and a shutter button 32 and a power source button 33 are provided on the upper surface of the camera body 31. Further, operation units 34 and 35 and a display unit 36 are provided on the back surface of the camera body 31. The display unit 36 is provided to display an image obtained by imaging and an image that is present within an angle of view before imaging.

An opening for photography, through which light from a target of photography enters, is provided at a central part of the front surface of the camera body 31. Further, a mount 37 is provided at a position corresponding to the opening for photography, and the interchangeable lens 20 is mountable on the camera body 31 by the mount 37. The interchangeable lens 20 is the imaging lens of the present invention housed in a lens barrel.

Further, an imaging device (not illustrated), such as a CCD, which receives an image of a subject formed by the interchangeable lens 20 and outputs imaging signals based on the image, a signal processing circuit for generating an image by processing the imaging signals output from the imaging device, a recording medium for recording the generated image and the like are provided in the camera body 31. This camera 30 performs photography of a still image for one frame each time when the shutter button 32 is pressed. Image data obtained by this photography are recorded in the recording medium.

When the imaging lens according to the present invention is adopted as the interchangeable lens 20 used in such a mirrorless single-lens camera 30, the size of the camera 30 with the lens mounted thereon is sufficiently small. Further, photography with high image qualities is possible.

So far, the present invention has been described by using embodiments and examples. However, the present invention is not limited to the embodiments nor to the examples, and various modifications are possible. For example, values of a curvature radius, a surface distance, a refractive index, an Abbe number, aspherical surface coefficients and the like of each lens element are not limited to the values in the numerical value examples, but may be other values.

What is claimed is:

1. An imaging lens consisting of:
   a first lens group;
   a stop; and
   a second lens group in this order from an object side,
   wherein the first lens group consists of a 1-1st lens having negative refractive power and a meniscus shape with a convex surface facing the object side and a 1-2nd lens having positive refractive power, and an object-side lens surface of which has a convex shape facing the object side, in this order from the object side, and
   wherein the second lens group consists of a 2-1st lens having positive refractive power and a meniscus shape with a convex surface facing an image side, a 2-2nd lens having negative refractive power, and an object-side lens surface of which has a concave shape facing the object side, and an absolute value of a curvature radius of the object-side lens surface of which is less than an absolute value of a curvature radius of an image-side lens surface thereof, and a 2-3rd lens having positive refractive power, and an object-side lens surface of which has a convex shape facing the object side, in this order from the object side, and wherein the following conditional formula (5) is satisfied:

$$Ndp > 1.75 \qquad (5), \text{where}$$

Ndp: an average of refractive indices of the 1-2nd lens, the 2-1st lens and the 2-3rd lens for d-line, and wherein the first lens group has a distance from the second lens group that is fixed at all times.

2. The imaging lens, as defined in claim 1, wherein each of the three lenses constituting the second lens group is arranged with an air space therebetween.

3. The imaging lens, as defined in claim 1, wherein one of the three lenses constituting the second lens group is an aspheric lens having at least one aspherical surface.

4. The imaging lens, as defined in claim 3, wherein all lenses in an entire system except the aspheric lens are spherical lenses.

5. The imaging lens, as defined in claim 1, wherein the following conditional formula (1) is satisfied:

$$1.2 < f/|f4| < 2.9 \qquad (1), \text{where}$$

f4: a focal length of the 2-2nd lens, and
f: a focal length of an entire system.

6. The imaging lens, as defined in claim 5, wherein the following conditional formula (1-1) is satisfied:

$$1.3 < f/|f4| < 2.8 \qquad (1\text{-}1).$$

7. The imaging lens, as defined in claim 1, wherein the following conditional formula (2) is satisfied:

$$0.5 < f/f3 < 1.5 \qquad (2), \text{where}$$

f3: a focal length of the 2-1st lens, and
f: a focal length of an entire system.

8. The imaging lens, as defined in claim 7, wherein the following conditional formula (2-1) is satisfied:

$$0.6 < f/f3 < 1.4 \qquad (2\text{-}1).$$

9. The imaging lens, as defined in claim 1, wherein the following conditional formula (3) is satisfied:

$$0.5 < f/f5 < 1.5 \qquad (3), \text{where}$$

f5: a focal length of the 2-3rd lens, and
f: a focal length of an entire system.

10. The imaging lens, as defined in claim 9, wherein the following conditional formula (3-1) is satisfied:

$$0.6 < f/f5 < 1.4 \qquad (3\text{-}1).$$

11. The imaging lens, as defined in claim 1, wherein the following conditional formula (4) is satisfied:

$$0.6 < f/fG1 < 1.5 \qquad (4), \text{where}$$

fG1: a focal length of the first lens group, and
f: a focal length of an entire system.

12. The imaging lens, as defined in claim 11, wherein the following conditional formula (4-1) is satisfied:

$$0.7 < f/fG1 < 1.4 \qquad (4\text{-}1).$$

13. The imaging lens, as defined in claim 1, wherein the following conditional formula (5-1) is satisfied:

$$Ndp > 1.78 \qquad (5\text{-}1).$$

14. The imaging lens as defined in claim 1, wherein the following conditional formula (6) is satisfied:

$$0.3 < f123/f < 0.9 \qquad (6), \text{where}$$

f123: a combined focal length of the 1-1st lens, the 1-2nd lens and the 2-1st lens, and
f: a focal length of an entire system.

15. The imaging lens, as defined in claim 14, wherein the following conditional formula (6-1) is satisfied:

$$0.4 < f123/f < 0.8 \qquad (6\text{-}1).$$

16. The imaging lens, as defined in claim 1, wherein the following conditional formula (7) is satisfied:

$$8° < |\alpha| < 20° \qquad (7), \text{where}$$

α: an angle of a chief ray reaching a maximum image height with respect to an optical axis when the imaging lens is focused on an object at infinity.

17. The imaging lens, as defined in claim 16, wherein the following conditional formula (7-1) is satisfied:

$$9° < |\alpha| < 19° \qquad (7\text{-}1).$$

18. The imaging lens, as defined in claim 1, wherein the following conditional formula (8) is satisfied:

$$0.35 < Y/f < 0.70 \qquad (8), \text{where}$$

Y: a maximum image height, and
f: a focal length of an entire system.

19. The imaging lens, as defined in claim 1, wherein the following conditional formula (9) is satisfied:

$$0.70 < ST/TL < 0.95 \qquad (9), \text{where}$$

ST: a distance on an optical axis from the stop to an image plane, and
TL: a distance on the optical axis from a most-object-side lens surface in an entire system to the image plane when a back focus portion is a distance in air.

20. An imaging apparatus comprising:
the imaging lens, as defined in claim 1.

* * * * *